United States Patent [19]

Aikawa et al.

[11] Patent Number: 5,043,833
[45] Date of Patent: Aug. 27, 1991

[54] MAGNETIC HEAD ASSEMBLY

[75] Inventors: Shinichi Aikawa, Mitaka; Fumio Nagase, Tama; Yoshiaki Sakai, Higashikurume, all of Japan

[73] Assignee: Teac Corporation, Japan

[21] Appl. No.: 535,113

[22] Filed: Jun. 8, 1990

Related U.S. Application Data

[63] Continuation-in-part of Ser. No. 273,892, Nov. 21, 1988, abandoned.

[30] Foreign Application Priority Data

Nov. 24, 1987 [JP] Japan .................. 62-294209

[51] Int. Cl.$^5$ .................................. G11B 5/48
[52] U.S. Cl. ...................... 360/104; 360/103; 360/122
[58] Field of Search ................ 360/102-104, 360/122

[56] References Cited

U.S. PATENT DOCUMENTS 4,835,640 5/1989 Endo .................... 360/103

OTHER PUBLICATIONS

Saishin Denshi Zairyo-gaku (Updated Electronic Materials), published from Fukkan Publishing Company of Tainan City, Taiwan in 1983.

Primary Examiner—A. J. Heinz
Attorney, Agent, or Firm—Andrus, Sceales, Starke & Sawall

[57] ABSTRACT

A magnetic head assembly comprises a base defined with a flat slide surface on which a magnetic disk is contacted and a magnetic core embedded on the base surface so as to form a flush surface on the slide surface. The slide surface extends in a direction of rotation of the magnetic disk for a length B and has a width A in which the ration B/A is chosen equal to or larger than 4. The length B is set so as to satisfy a relation $0.35\,m \leq B \leq 0.55\,m$, where m is the length of an access opening in the housing for the disk in the rotational direction of the disk. At the same time, the slide surface is finished with such a precision that the slide surface shows a specular gloss. With such a magnetic head, the vibration of magnetic head assembly associated with rotation of the magnetic disk is successfully suppressed.

11 Claims, 5 Drawing Sheets 3.5" FDD

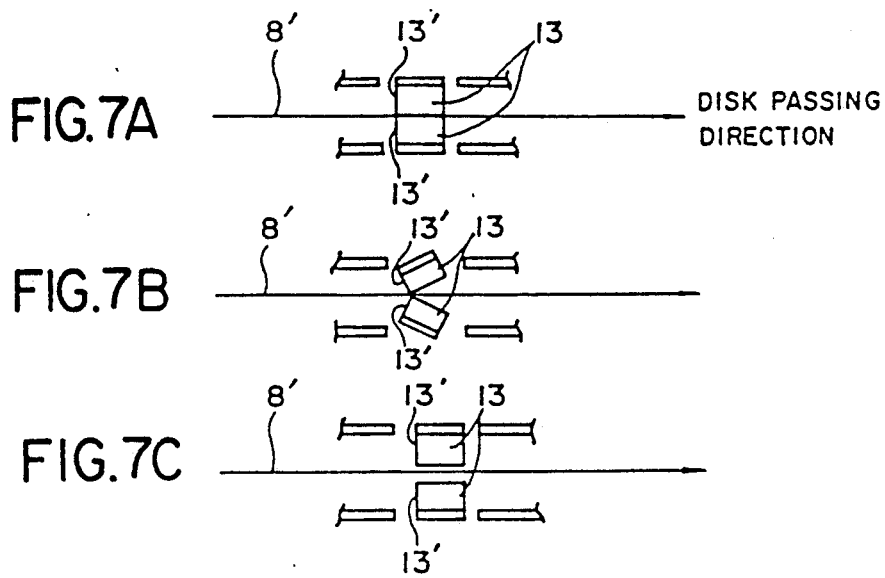
FIG.7A
FIG.7B
FIG.7C
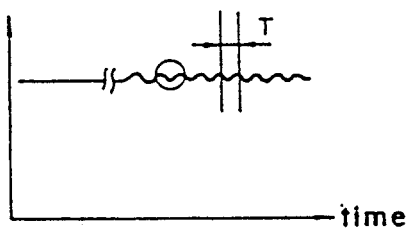
FIG.8A
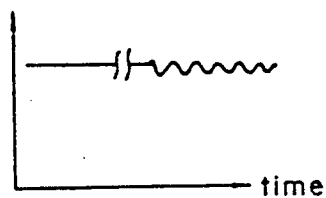
FIG.8C
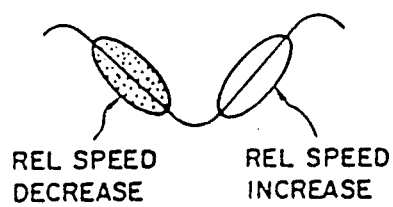
FIG.8B
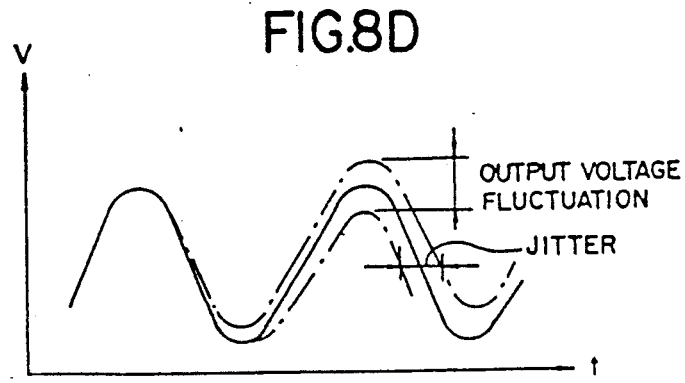
FIG.8D

MAGNETIC HEAD ASSEMBLY

BACKGROUND OF THE INVENTION

The present invention is a continuation-in-part application of the U.S. patent application Ser. No. 273,892 filed Nov. 21, 1988, now abandoned.

The present invention generally relates to magnetic heads of a magnetic recording/reproducing apparatus for recording and/or reproducing an information signal on and from a rotary magnetic disk, and in particular to a magnetic head assembly which can avoid mechanical vibration associated with rotation of the rotary magnetic disk during the recording and/or reproducing operation of the magnetic recording/reproducing apparatus.

Generally, a flexible magnetic disk commonly referred to as a floppy disk is recorded or reproduced with an information signal by a magnetic recording/reproducing apparatus comprising a magnetic head disposed so as to contact with an upper and/or lower surface of the magnetic disk. The magnetic head is urged on the surface of the magnetic disk, and magnetizes a magnetic material deposited on the surface of the magnetic disk according to the information signal or produces an electrical signal on the basis of the magnetization of the magnetic disk.

In such a magnetic recording/reproducing apparatus, it is essential to maintain proper contact between the magnetic disk and the magnetic head in order to achieve a proper and satisfactory recording and/or reproduction. Thus, the magnetic head is carried on a resilient mechanical system which resiliently urges the magnetic head on the surface of the magnetic disk. However, such a resilient mechanical system tends to cause a large mechanical resonance when the frequency of the vibration of the magnetic head coincides with the resonant frequency of the mechanical system. In such a case, the magnetic head experiences a leap on the surface of the magnetic disk and erroneous recording or reproduction or even the dropout of the information signal may occur.

Conventionally, various systems have been proposed in order to avoid the resonance of the mechanical system carrying the magnetic head. For example, an additional elastic member is mounted on the mechanical system so as to change the resonant frequency. Alternatively, a vibration absorber having a low Q value is added to the resilient mechanical system. However, the provision of such an additional elastic member on the mechanical system results in an increase in size of the mechanical system and the magnetic recording/reproducing apparatus becomes large as a result. Further, the cost of manufacturing the magnetic recording/reproducing apparatus is increased. On the other hand, when the low Q material is added to the mechanical system, response in the mechanical system at the time of following the displacement or deformation of the magnetic disk becomes untolerably slow and the magnetic head cannot maintain proper contact with the magnetic disk. This eventually leads to the loss of contact between the magnetic head and the magnetic disk which in turn leads to erroneous recording or reproduction of the information signal.

SUMMARY OF THE INVENTION

Accordingly, it is a general object of the present invention to provide a novel and useful magnetic head assembly wherein the aforementioned problems are eliminated.

Another and more specific object of the present invention is to provide a magnetic head assembly of a magnetic recording/reproducing apparatus for recording and/or reproducing an information signal on and from a magnetic disk contained in a housing, said housing having a window with a length m for allowing the magnetic head assembly to make a contact with the magnetic disk, said magnetic head assembly comprising a slide body on which a magnetic core for recording and/or reproduction of the information signal is provided, wherein a slide surface is defined on the slide body for contacting with the surface of the magnetic disk with such a configuration that a length B of the slide surface in the rotational direction of the magnetic disk and a width A of the slide surface in the radial direction of the magnetic disk are chosen so as to satisfy a relation $B/A \geq 4$ and that the length B satisfies a relation $0.35 \text{ m} \leq B \leq 0.55 \text{ m}$.

According to the present invention, the vibration of the magnetic head assembly can be avoided without deteriorating the follow-up response of the magnetic head assembly following up the displacement or deformation of the magnetic disk. In other words, the present invention realizes a simple magnetic head assembly performing a stable recording and reproducing performance without adding extra members to the mechanical system carrying the magnetic head.

Other objects and further features of the present invention will become apparent from the following detailed description of a preferred embodiment of the present invention when read in conjunction with attached drawings.

BRIEF DESCRIPTION OF THE DRAWINGS

FIGS. 7(A)–(C) are diagrams showing a vibration of the magnetic head assembly caused as a result of stick slip between the magnetic head assembly and the magnetic disk; and FIGS. 8(A)–(D) are diagrams showing a change in relative speed between the magnetic head assembly and the magnetic disk caused as a result of the stick slip of the magnetic head assembly, and a change in the recording and reproducing characteristic resulting from the speed change.

DETAILED DESCRIPTION

Figure 1:
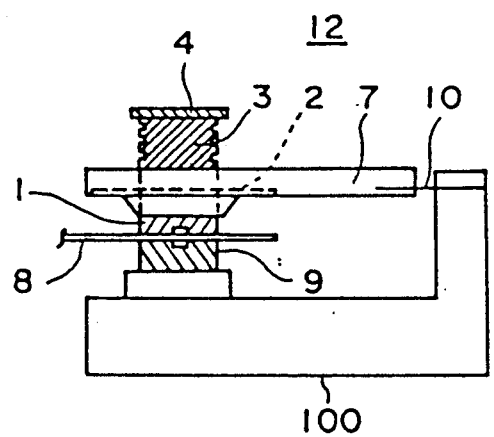
FIGS. 1 and 2 are diagrams showing prior art mechanical systems including a magnetic head assembly designed so as to avoid resonance.

FIG. 1 shows an example of a prior art mechanical system 12 used for carrying a magnetic head assembly of a magnetic recording/reproducing apparatus having a structure for avoiding mechanical resonance of the system. As is usual, the magnetic head assembly comprises a slide body and a magnetic core (not shown) carried on the slide body. Referring to the drawing, a flexible magnetic disk 8 is held between a lower magnetic head assembly 9 mounted on a carriage 100 and an upper magnetic head assembly 1 carried by a swing arm 7 which in turn is held rotatably on the carriage 100 via a leaf spring 10. The upper magnetic head 1 is mounted on the swing arm 7 via a resilient gimbal support means 2 such that the magnetic head assembly 1 can tilt about two mutually perpendicular axes one of which is extending in a radial direction of the magnetic disk 8 and the other one of which is extending in a direction of rotation of the magnetic disk 8. As a result, the magnetic head assembly 1 can follow the displacement or deformation of the magnetic disk 8 when the disk 8 is rotated.

As the mechanical system 12 of FIG. 1 includes the swing arm 7 which is a movable member as well as the gimbal support means 2 and spring 10 which are resilient members, the system 12 constitutes a resonant system. Thus, there is a substantial risk that the magnetic head assembly 1 leaps on the magnetic disk 8 when the magnetic head assembly 1 experiences a vibration and a resonance is established between the mechanical system 12, and the magnetic head assembly 1. When such a resonance occurs, the magnetic head assembly is separated from the surface of the magnetic disk 8 and erroneous recording and/or reproduction or dropout of the recorded signal or reproduced signal may occur.

Figure 2:
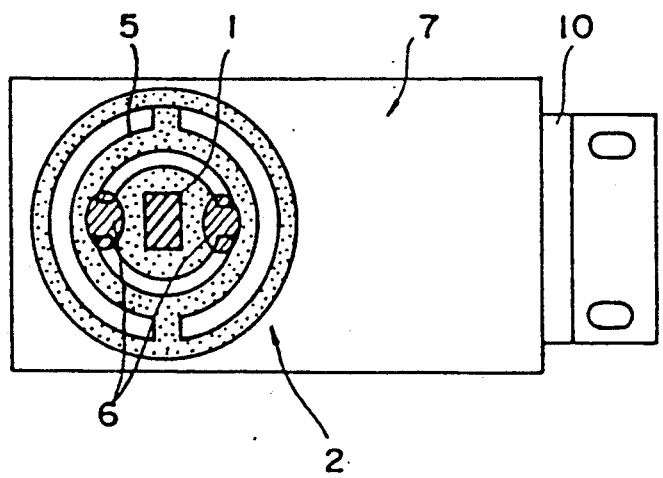

In order to avoid such unwanted leaping motion of the magnetic head, the conventional mechanical system shown in FIG. 1 uses an additional metal plate member 4 having a suitable size. The metal plate member 4 is mounted on the gimbal support means 2 via a rubber or sponge vibration absorber 3 having a low O value so as to change the natural frequency of the mechanical system and further to absorb the vibrational energy. Another prior art system uses an absorber 6 made of silicone rubber or the like which has a low O value. The absorber 6 is attached to the gimbal support means 2 as shown in FIG. 2 so as to attenuate the vibration of the magnetic head 1 carried by the gimbal support means 2.

However, these systems, though successful in suppressing the occurrence of resonance, are unsatisfactory because the use of the mechanical system 12 shown in FIG. 1 including the absorber 3 and the metal plate 4 increases the height of the system 12 which is contradictory to the requirement of reducing the size of the magnetic recording/reproducing apparatus. Further, such an use of additional parts results in an increase in manufacturing cost of the magnetic recording/reproducing apparatus. In the system shown in FIG. 2 in which the absorber 6 is mounted on the gimbal support means 2, the follow-up response of the magnetic head assembly 1 following up the displacement or deformation of the magnetic disk during the operation of the magnetic recording/reproducing apparatus is deteriorated and the contact between the magnetic head assembly 1 and the magnetic disk 8 may be lost occasionally.

Figure 3A:
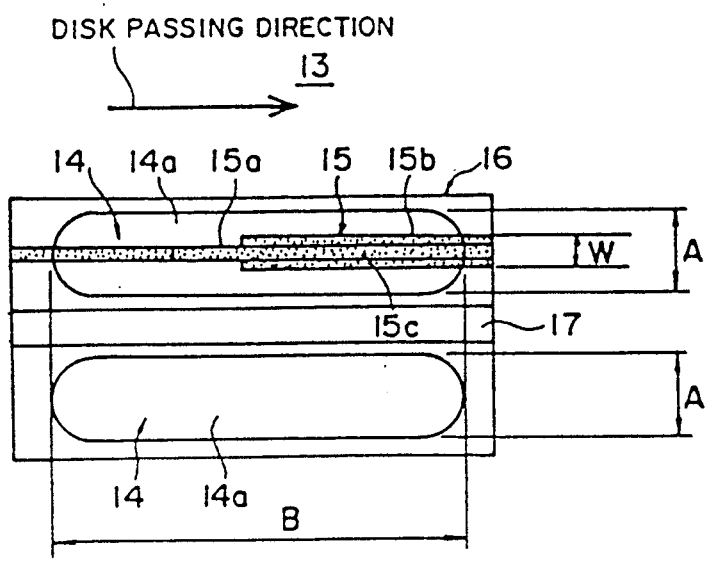
FIGS. 3(A)–(C) are respectively a plan view, front view and a side view showing an embodiment of the magnetic head assembly of the present invention.

Next, an embodiment of the magnetic head assembly of the present invention will be described with reference to FIGS. 3(A)–(C). Referring to FIG. 3(A), a magnetic head assembly 13 of the present embodiment comprises a ceramic slide body 16 defined with a flat slide surface 14, and this flat slide surface 14 is adapted for contacting with the magnetic disk (not shown). As can be seen in the drawing, the slide surface 14 is extended in the rotational direction of the magnetic disk and is divided into a first slide surface part 14a and a second slide surface part 14b by a groove 17 extending in the direction of rotation of the magnetic disk contacting with the slide surface 14 as clearly illustrated in FIG. 3(C). As a result, the air trapped between the magnetic head assembly and the surface of the magnetic disk is allowed to escape and the formation of an air film between the magnetic disk and the magnetic head assembly is prevented. The first and second slide surface parts 14a and 14b are configured to have an identical shape, and one of the slide surface parts, 14a, is embedded with a magnetic core 15 extending in the direction of rotation of the disk. The magnetic core 15 is made of ferrite and comprises a read/write core 15a used for recording and/or reproducing the information signal and a pair of erase cores 15b and 15c. In the present embodiment, the size of the slide surface part 14a measured in the radial direction of the disk referred to hereinafter as a width and designated in FIG. 3(A) by a letter A is chosen at least twice as large as a width W of the magnetic core 15 which is a dimension of the core 15 measured in the radial direction of the magnetic disk. By setting the width A at least twice as large as the width W as such, the flat processing or finishing of the surface of the magnetic core 15 so that the surface of the core 15 becomes flush with the flat slide surface 14 is facilitated. Thus, the surface of the magnetic core 15 is made flat and excellent contact is achieved between the entire surface of the magnetic core 15 and the magnetic disk.

Figures 3B, 3C:
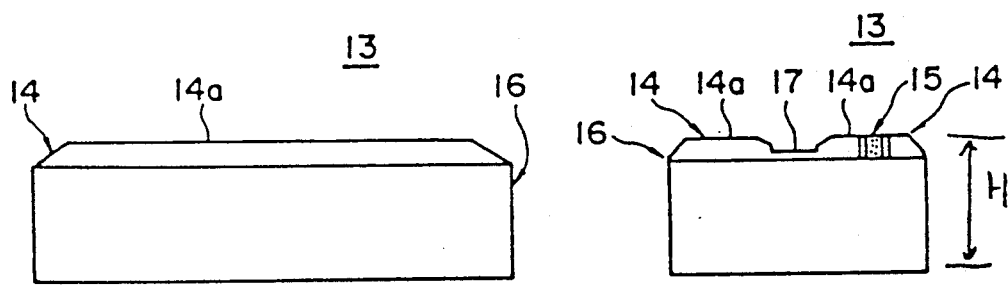

In the magnetic head assembly as illustrated in FIGS. 3(A)–(C), the applicant has found that the vibration of the magnetic head assembly is successfully suppressed without providing additional members as is used in the prior art magnetic head assembly by configuring and finishing the slide surface 14 suitably. More specifically, it was found that the mechanical vibration of the magnetic head assembly 13 is effectively suppressed by choosing a dimension B (FIG. 3(A)) of the slide surface 14 measured in the direction of rotation of the magnetic disk and referred to hereinafter as a length as well as the aforementioned width A of the slide surface 14 such that the ratio B/A is equal to or larger than 4 (B/A≧4). The ratio B/A is chosen to be equal to or larger than about 4 (B/A≧4) in the case where the magnetic disk is the currently used 3.5 inch diameter standardized flexible magnetic disk accommodated in a hard cartridge. When the magnetic disk is the currently used, normally designated 5 inch diameter standardized flexible magnetic disk accommodated in a soft jacket (actual disk diameter 5.25 inches), the ratio B/A is chosen to be equal to or greater than about 5 (B/A≧5). In other words, the resonant oscillation of the magnetic head assembly 13 can be suppressed when the ratio B/A satisfies the condition B/A ≧4 or B/A≧5 depending on the type of magnetic disk.

On the other hand, the upper limit of the ratio B/A is determined by various factors such as the state of contact between the magnetic head assembly and the magnetic head, curvature or radius of recording tracks on the magnetic disk, overall size of the magnetic recording/reproducing apparatus, and the like. Generally, the maximum of the ratio B/A is set to be less than about 6 by taking these factors into consideration. Thus, the preferable range of the ratio B/A is limited to $4 \leq B/A \leq 6$ in the case of the 3.5 inch diameter disk and $5 \leq B/A$ 6 in the case of the 5 inch diameter disk.

Further it was found at the same time that the slide surface part 14a including the magnetic core 15 and the slide surface part 14b have to be finished flat with an extreme precision. Preferably, the slide surface 14 is finished to such an extent that the surface shows a specular gloss. For example, the first slide surface part 14a and the second slide surface part 14b are finished with such a precision that the difference between the maximum of the peak on the surface and the minimum of the valley on the surface is less than about 0.3 um. The surface roughness of the slide surface is substantially smaller than the surface roughness of the magnetic disk. The roughness of the surface is checked by using an optical flat under a monochromatic light having a wave length in the range of 5900 A-6000 A.

Figure 4A:
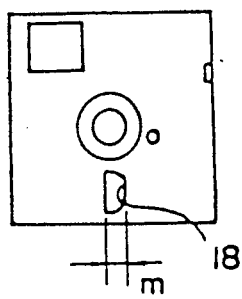
FIGS. 4(A) and (B) are diagrams showing examples of magnetic disks on which and from which the recording and reproduction of the information signal is made.
Figure 4B:
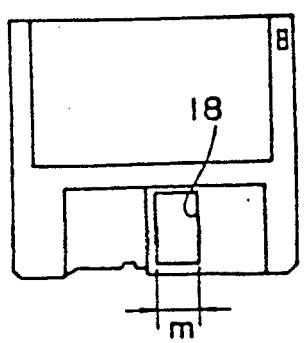

The length B of the slide surface 14 also represents the overall length of the magnetic core 15 which comprises the read/write core 15a and the erase core 15b, 15c and extends in the direction of rotation of the magnetic disk. It was found in the present invention that the suppression of resonance is most effective when the length B is set to about 35% to 55% of a length m which is a width of a cutout 18 provided on the jacket or cartridge of the magnetic disk (FIGS. 4(A) and (B)) for allowing contact between the magnetic disk in the jacket and the magnetic head assembly located outside the jacket. The resonance is most satisfactorily suppressed when a condition $0.35 \text{ m} \leq B \leq 0.45 \text{ m}$ is met when the magnetic disk is the 5 inch flexible magnetic disk accommodated in a flexible jacket. In the case of the 3.5 inch diameter flexible magnetic disk accommodated in a hard cartridge, a range of $0.45 \text{ m} \leq B \leq 0.55 \text{ m}$ was found to be preferable.

Thus, according to the present invention, the vibration of the magnetic head assembly can be particularly avoided in the case of a 3.5 inch flexible magnetic disk contained in a hard cartridge when the head has the relation $B/A \geq 4$ and the length B satisfies a relation $0.45 \text{ m} \leq B \leq 0.55 \text{ m}$.

Next, the experiments undertaken by the applicants of the present invention and forming the foundation of the present invention will be described.

Figure 5A:
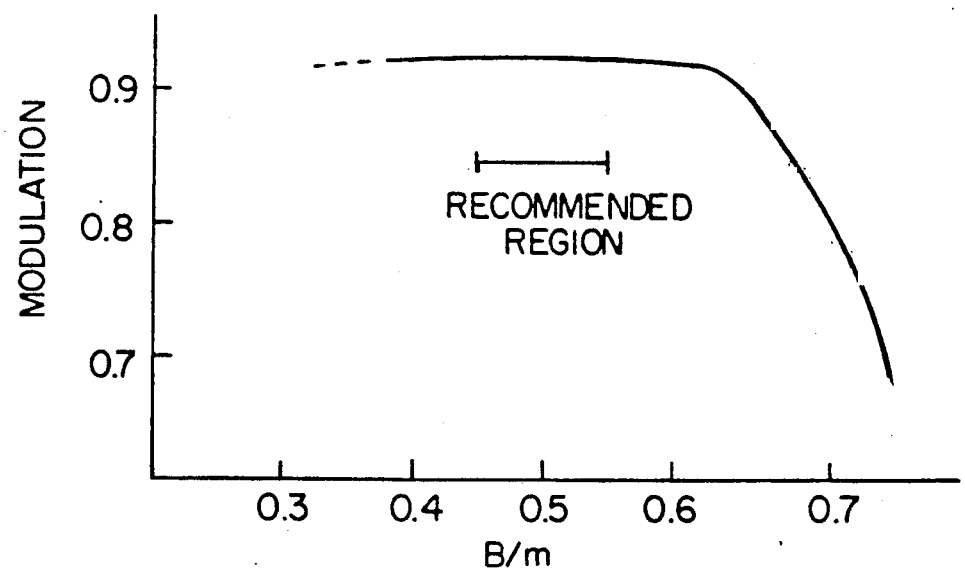
FIGS. 5(A) and (B) are graphs showing the result of experiments undertaken for evaluating the performance of the magnetic head assembly of the present invention for the case of the 3.5 inch diameter standardized magnetic disk.

FIGS. 5(A) and (B) show the result of experiments undertaken by the applicants for evaluating the performance of the magnetic head assembly of the present invention, wherein a so-called 3.5 inch standardized flexible magnetic disk accommodated in a hard cartridge is used as the medium for recording test signals. As the magnetic disk used was the standardized 3.5 inch disk, the cutout 18 formed on the hard cartridge had the standardized length m which is set to be 9 mm +/−0.20 mm.

Throughout the experiments, the magnetic head assembly used had the slide surface 14 with the width A set to be 0.75 mm, and the slide body 16 forming the magnetic head assembly had a height H (FIG. 3(C)) measured perpendicularly to the slide surface A which was set to be 2.7 mm +/−0.05 mm. In the experiments, measurements were made with respect to the modulation of the reproduced test signal, i.e. the variation of amplitude of the test signal reproduced from the disk and further with respect to the percentage of occurrence of dropout of the reproduced test signal, while using various magnetic head assemblies having various lengths B. Of course, the test signal was recorded on the disk with a constant amplitude. The modulation in FIG. 5(A) is defined as a ratio of the minimum amplitude of the reproduced test signal divided by the maximum amplitude of the same.

Figure 5B:
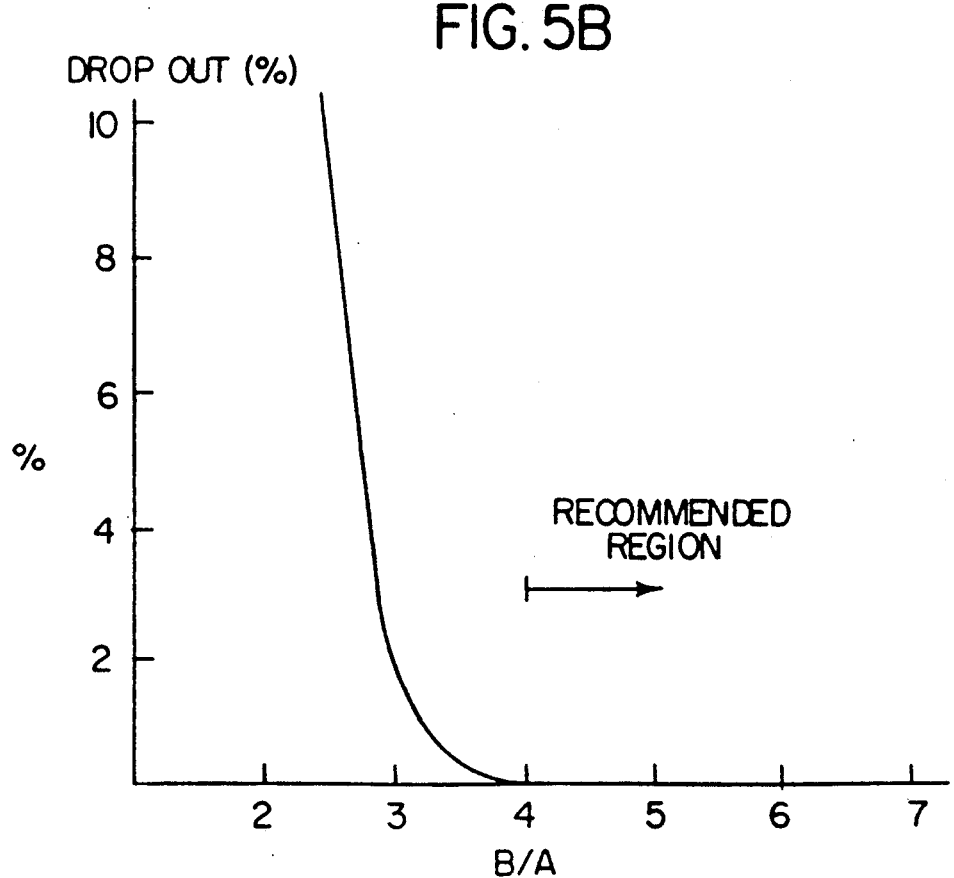

In FIG. 5(A), the modulation is plotted as a function of a parameter B/m. It is clearly seen that a range between about 0.45 and 0.55 is particularly preferable, as the modulation is substantially flat in this range and takes a maximum which is close to one. FIG. 5(B), on the other hand, shows the percentage of dropout of the reproduced test signal caused as a result of resonance, as a function of the parameter B/A. It can be seen clearly that the dropout is substantially reduced to zero when the parameter B/A is set larger than about 4.

Figure 6A:
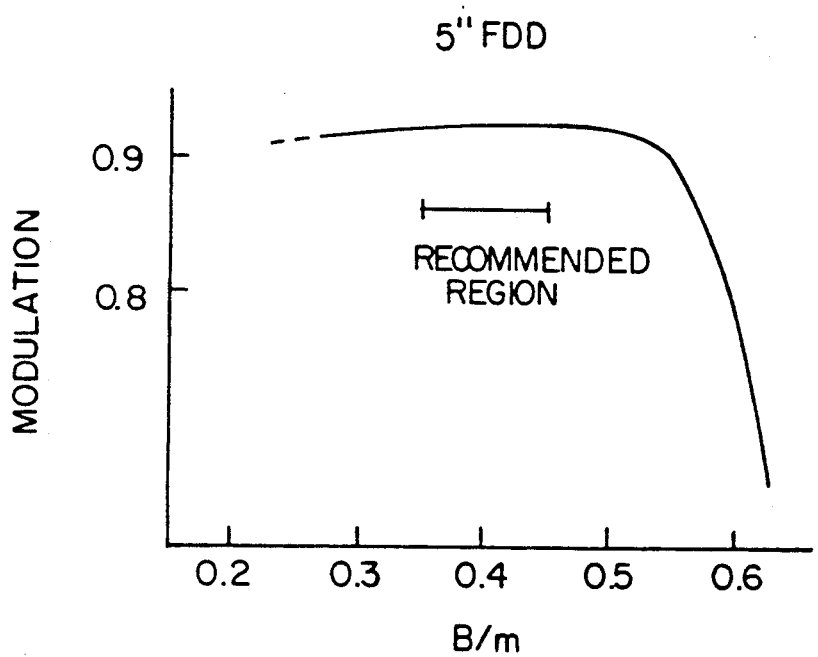
FIGS. 6(A) and (B) are graphs similar to FIGS. 5(A) and (B) for the case of the 5 inch diameter standardized magnetic disk.
Figure 6B:
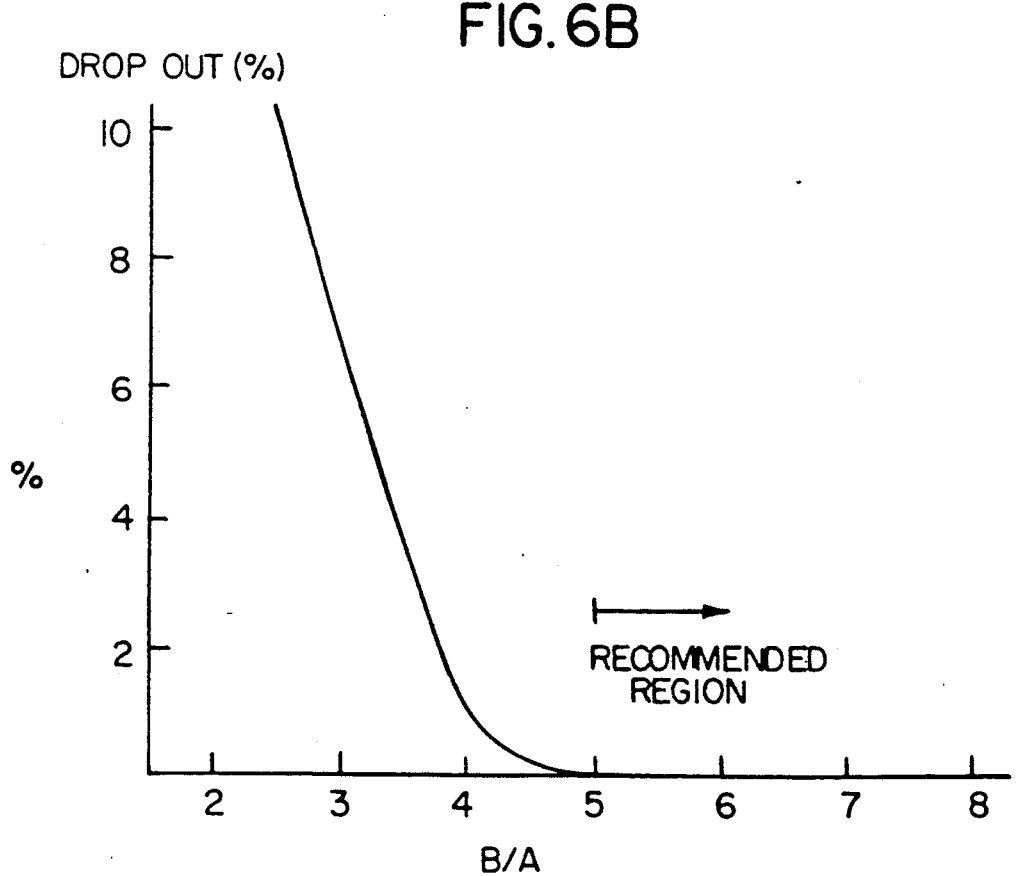

FIGS. 6(A) and 6(B), on the other hand, show the result of the same experiments for the case of the 5 inch diameter magnetic disk accommodated in the soft jacket. In this case, it is clearly seen that a range of 0.35-0.45 is preferable for the parameter B/m ($0.35 \leq B/m \leq 0.45$) while a range larger than about 5 is preferred for the parameter B/A ($B/A \geq 5$).

The reason why the vibration is suppressed in the aforementioned construction of the magnetic head assembly 13 is not fully understood. According to the experiment by the applicant performed with 5 inch disks, virtually no resonance was observed when the ratio B/A is set larger than 5 and when the slide surface parts 14a and 14b are finished flat with the degree of precision as already described. On the other hand, when the length B is increased and the ratio B/A exceeds 6, the length B of the slide surface 14 becomes excessively long and it becomes difficult to maintain a proper contact between the flexible disk and the slide surface throughout the entire length of the slide surface Further, there is a possibility that the magnetic head assembly 13 having such a configuration causes a resonance when the ratio B/A increases beyond the range defined above. Furthermore, the increase in the length B leads to the increase in dimension of the magnetic head assembly and is not preferable from the view point of size reduction of the magnetic recording/reproducing apparatus.

When the ratio B/A is decreased below about 5, on the other hand, there is a substantial risk that a stick slip phenomenon appears between the magnetic head assembly 13 and the magnetic disk which in turn causes a mechanical vibration of the magnetic head assembly. Hereinafter, this mechanical vibration of the magnetic head assembly due to the stick slip will be described with reference to FIGS. 7(A)–(C). FIG. 7(A) shows a normal state in which the magnetic head assembly 13 is engaged with a magnetic disk 8' such that the slide surface 14 is parallel to and is contacted with the magnetic disk 8'. In this state, the entire surface of the slide surface 14 is contacted with the magnetic disk 8' FIG. 7(B), on the other hand, shows a state of the magnetic head assembly 13 when the magnetic head assembly is tilted due to the stick slip of the magnetic head assembly on the magnetic disk. Referring to FIG. 7(B), when the stick slip phenomenon appears, the magnetic head assembly 13 is pushed in the direction of rotation of the magnetic disk 8' by the magnetic disk as a result of frictional force acting between the slide surface 14 of the magnetic head assembly 13 and the magnetic disk 8'. As the magnetic head assembly 13 is prevented from being moved together with rotation of the magnetic disk by a carriage (not shown) similar to the carriage 100 of FIG. 1, there is a tendency that the magnetic head assembly 13 is rotated or tilted about its front end 13' opposing the rotational movement of the magnetic disk 8' as shown in FIG. 7(B) as a result of moment caused by the frictional force. Such a tendency is enhanced with decreased length B or decrease in the ratio B/A. When the tilting has reached a threshold angle, the frictional engagement between the magnetic head assembly and the disk is overcome by a counteracting moment applied by the mechanical system including the gimbal plate (not shown in FIGS. 7(A)-(C)) which carries the magnetic head assembly. This counteracting moment acts on the magnetic head assembly so as to recover the initial state shown in FIG. 7(A), and the magnetic head assembly 13 suddenly returns to a state in which the slide surface 14 is parallel to the magnetic disk 8'. This state is shown in FIG. 7(C). Thereby, the magnetic head 13 momentarily loses its contact between the magnetic disk as shown in the drawing. Then, the magnetic head assembly 13 recovers its contact again with the magnetic disk 8' and returns to the initial state shown in FIG. 7(A). Thus, a sequence of states shown in FIGS. 7(A)-(C) is repeated and the magnetic head assembly 13 is vibrated. Such a vibration of the magnetic head assembly causes a cyclic change in the speed of the magnetic head assembly 13 relative to the rotational speed of the magnetic disk 8' as shown in FIG. 8(A). FIG. 8(B) illustrates this cyclic speed change in an enlarged scale. Referring to FIG. 8(B), the descending line part marked with dotted area corresponds to a transient state in which the magnetic head assembly 13 changes its state from the state in FIG. 7(A) to the state in FIG. 7(B). On the other hand, the rising line part marked by a circle in FIG.8(B) corresponds to a transient state in which the magnetic head assembly 13 changes its state from the state in FIG. 7(B) to the state in FIG. 7(C). As a result of repetition of the states in FIGS. 7(A)-(C), a minute fluctuation appears in the relative speed of the magnetic head assembly 13 to the magnetic disk 8'. The flat line part in FIGS. 8(A) and 8(C) shows a state in which no stick slip is caused.

When the stick slip is caused, the magnetic head assembly momentarily loses its contact with the magnetic disk, and as a result, the output voltage V of the magnetic head assembly fluctuates as schematically illustrated in FIG.8(C). As a result, considerable amount of jitter appears in the output voltage signal shown in FIG. 8(D) in addition to the fluctuation in the output voltage. It should be noted that a normal output signal is illustrated in FIG.8(D) by a solid line.

As already described, one can prevent the vibration of the magnetic head assembly 13 due to the stick slip phenomenon by choosing the ratio B/A larger than or equal to 4 in the case of the 3.5 inch flexible magnetic disk, and at the same time by finishing the slide surface smooth with high precision. By setting the ratio B/A larger than 4, it is believed that the counteracting moment applied by the mechanical system is increased and the magnetic head assembly is urged to the original state more effectively. Further, by polishing the slide surface, one can reduce the coefficient of friction which is the cause of the stick slip phenomenon.

Thus, by choosing the ratio B/A as described, the magnetic head assembly 13 becomes virtually free from vibration and a stable recording and reproduction can be achieved.

It should be noted that the present invention is not limited to the magnetic head assembly for recording and/or reproducing an information signal on both sides of the magnetic disk as is described but is also applicable to the magnetic head assembly for recording and/or reproducing the information signal on only one side of the magnetic disk as well.

Further, the present invention is not limited to these embodiments but various variations and modifications may be made without departing from the scope of the present invention.

We claim:

1. A magnetic head assembly for recording and/or reproducing an information signal on and from a disk-shaped rotary magnetic recording medium contained in a housing with an access opening having a length m in a rotational direction of the recording medium, said magnetic head assembly comprising:
   a base;
   a slide surface defined on said base so as to make a contact with the disk-shaped rotary magnetic recording medium; and
   a magnetic core embedded in said slide surface;
   wherein said slide surface extends in a longitudinal direction which coincides to the direction of rotation of the disk-shaped rotary magnetic recording medium with such a configuration that a length B of the slide surface which is a dimension of the slide surface in its longitudinal direction and a width A of the slide surface which is a dimension of the slide surface in a lateral direction perpendicular to said longitudinal direction satisfy a relation $B/A \geq 4$; wherein the length B is set so as to satisfy a relation $0.35\,m \leq B \leq 0.55\,m$; and wherein said slide surface is finished with high precision such that the surface roughness of the slide surface is substantially smaller than the surface roughness of a recording surface of the disk-shaped rotary magnetic recording medium on which the information signal is recorded.

2. A magnetic head assembly as claimed in claim 1 in which the length B and the width A satisfy the relation $B/A \geq 5$.

3. A magnetic head assembly as claimed in claim 1 in which the length B is set so as to satisfy a relation $0.35\,m \leq B \leq 0.45\,m$.

4. A magnetic head assembly as claimed in claim 1 in which the length B is set so as to satisfy a relation $0.45\,m \leq B \leq 0.55\,m$.

5. A magnetic head assembly as claimed in claim 1 in which the magnetic recording medium and housing comprise a flexible magnetic disk having a standardized diameter of 3.5 inches and accommodated in a cartridge having a rigidity substantially larger than a flexible magnetic disk, and in which the length 8 is set so as to satisfy a relation $0.45\,m \leq B \leq 0.55\,m$.

6. A magnetic head assembly as claimed in claim 1 in which the magnetic recording medium and housing comprise a flexible magnetic disk having a standardized diameter of 5.25 inches and accommodated in a flexible jacket, in which the length B and the width A satisfy the relation $B/A \leq 5$, and in which the length B is set so as to satisfy a relation $0.35\,m \leq B \leq 0.45\,m$.

7. A magnetic head assembly as claimed in claim 1 in which said slide surface defined by the length A and the width B is made flat, and the magnetic core embedded in the slide surface is defined by a flat surface which is flush with the slide surface.

8. A magnetic head assembly as claimed in claim 1 in which said slide surface including said flat surface of the magnetic core is polished so as to show a specular gloss.

9. A magnetic head assembly as claimed in claim 1 in which said slide surface including said flat surface of the magnetic core is polished to such a degree that the maximum difference between the peak and the bottom of projections and depressions remaining on the slide surface is substantially less than 0.3 jum.

10. A magnetic head assembly as claimed in claim 1 in which said slide surface is divided into a first slide surface part and a second slide surface part by a groove extending in the direction of rotation of the disk-shaped rotary magnetic medium.

11. A magnetic head assembly as claimed in claim 10 in which said magnetic core extends in the direction of rotation of the disk-shaped rotary magnetic recording medium and is embedded in one of said first and second slide surface parts such that a surface defining the magnetic core forms a flush surface with the slide surface part on which the magnetic core is embedded.

* * * * *